United States Patent [19]

Nishimuro et al.

[11] Patent Number: 5,108,555
[45] Date of Patent: Apr. 28, 1992

[54] ELECTRODE FOR ELECTRICAL DISCHARGE MACHINING AND PROCESS FOR MANUFACTURING THE SAME

[75] Inventors: Satoshi Nishimuro, Yokohama; Takeo Hori, 175-1, Ichinokura-cho 7-chome, Tajimi-shi, Gifu-ken; Kiyoko Ban, Aichi, all of Japan

[73] Assignees: Cusp Dental Supply Co., Ltd., Aichi; Hakuji Noguchi, Koriyama; Takeo Hori, Tajimi; Japan Nus Co., Ltd., Tokyo, all of Japan

[21] Appl. No.: 649,485

[22] Filed: Feb. 1, 1991

Related U.S. Application Data

[63] Continuation-in-part of PCT JP90/00730, Jun. 5, 1990.

[30] Foreign Application Priority Data

Jun. 7, 1989 [JP] Japan .................. 1-144746

[51] Int. Cl.$^5$ .................. C25D 5/00; C25D 5/34; C25D 17/10; C25D 17/12
[52] U.S. Cl. .................. 205/184; 204/280; 204/290 R; 427/123; 427/443.1; 427/443.2; 445/49; 445/58; 205/215; 205/291
[58] Field of Search .................. 445/49, 50, 58; 427/123, 443.1, 443.2; 219/69.15; 204/3, 23, 52.1, 280-281, 290 R

[56] References Cited

U.S. PATENT DOCUMENTS

| | | | |
|---|---|---|---|
| 3,244,852 | 4/1966 | Herterick et al. | 445/49 X |
| 3,496,987 | 2/1970 | Peterson et al. | 219/69.15 X |
| 3,650,736 | 3/1972 | Broom | 445/49 X |
| 3,689,729 | 9/1972 | Neward et al. | 204/3 X |
| 4,301,356 | 11/1981 | Tanei et al. | 252/502 X |
| 4,373,127 | 2/1983 | Haskett et al. | 219/69.15 |

FOREIGN PATENT DOCUMENTS

| | | |
|---|---|---|
| 59-152023 | 8/1984 | Japan . |
| 59-152024 | 8/1984 | Japan . |
| 2-226609 | 9/1990 | Japan . |

*Primary Examiner*—Donald R. Valentine
*Attorney, Agent, or Firm*—Frishauf, Holtz, Goodman & Woodward

[57] ABSTRACT

Disclosed is an electrode for electrical discharge used for diesinking, comprising an electrode member produced by subjecting a base and binder of gypsum hemihydrate powder and a filler of conductive metal powder to modeling and/or molding and setting into a desired form of electrode, and followed by plating the electrode member with a conductive metal; and a process for manufacturing the same, wherein a gypsum hemihydrate powder, a gypsum dihydrate powder in an amount of 1% by weight of the gypsum hemihydrate powder and a conductive metal powder are kneaded in vacuo, and water is added thereto to continue further kneading in vacuo, followed by casting into a mold having a predetermined shape transferred thereon to carry out hydration, molding and setting to provide an electrode member; after the electrode member is dried, it is plated with a conductive metal to enhance mutual continuity in the conductivity of the former conductive metal powder and also to form a thin metal layer on the surface of the electrode member. Since the present electrode for electrical discharge machining is based on a gypsum, even one having a subtle and complicated shape can easily be produced using an easy-to-make mold made of a silicone rubber and the like with high accuracy at low cost, so that it is particularly suitable for producing dental crown and bridge one by one. Further, the strength of the electrode is enhanced synergistically by the base of gypsum hemihydrate and the conductive metal layer formed on the surface of the electrode member, allowing precise electrical discharge machining of hard materials such as titanium at the desired speed which was impossible by use of the conventional electrode impregnated with a conductive solution containing a graphite and the like dispersed therein instead of the plating treatment.

16 Claims, 1 Drawing Sheet

ELECTRODE FOR ELECTRICAL DISCHARGE MACHINING AND PROCESS FOR MANUFACTURING THE SAME

This application is a continuation-in-part application of International Application PCT/JP90/00730 filed Jun. 5, 1990.

BACKGROUND OF THE INVENTION

This invention relates to an electrode for electrical discharge machining, particularly an electrode for electrical discharge used for diesinking and to a process for manufacturing the same.

As the electrode for electrical discharge machining used for diesinking, those comprising graphite/beryllium/copper alloys processed by a three-dimensional machine tool are generally used. However, those electrodes for electrical discharge machining which primarily comprises graphite etc. suffer problems that they not only require considerable time for the machining with poor accuracy, but also expensive machinery, leading to rise in cost. Under such circumstances, the present inventors have previously developed an electrode for electrical discharge machining, which comprises an electrode member produced by subjecting a base and binder of gypsum hemihydrate powder and a filler of conductive metal powder to modeling and/or molding and setting into a desired form of electrode, followed by impregnation with an electrically conductive solution such as a graphite suspension (micro particles of natural graphite suspended in ammonia solution; e.g. "HITA-SOL", trade name, manufactured by Hitachi Chemical Co., Ltd.) and the like to enhance mutual continuity in the conductivity of the former conductive metal powder dispersed as a filler in the electrode member and filed as Japanese Patent Application No. 46069/1989. Nevertheless, in an attempt of machining various types of products by means of electrical discharge machining using the electrode as disclosed in the previously filed Patent Application, problem has arisen that if such electrode is used as such, its durability is questionable due to the brittleness of the material; only a very low amperage of machining current can be applied to the electrode since a current cannot be charged at high density due to the local sparsity in the mutual continuity between the metal powder particles to easily cause internal discharge. Besides, if such electrode is used for the machining of a subtle dental crown and bridge comprising a hard material such as titanium, the electrode wears off quickly and the desired product cannot be obtained due to insufficient machining accuracy.

SUMMARY OF THE INVENTION

This invention has been accomplished with a view to providing an electrode for electrical discharge machining used for diesinking having overcome the above problems and a process for manufacturing the same; which electrode comprises an electrode member produced by subjecting a base and binder of gypsum hemihydrate powder and a filler of conductive metal powder to modeling and/or molding and setting into a desired form of electrode, followed by plating the electrode member with a conductive metal to enhance continuity in the conductivity of the conductive metal powder particles dispersed as a filler in the electrode member and also forming a thin metal layer on the surface thereof.

In the electrode according to this invention, the base gypsum hemihydrate powder, which is a material for imparting moldability and strength, also serves as a binder, and an α-type gypsum hemihydrate which is commercially available as a dental stone is preferably used since α-type gypsum hemihydrate has a characteristic that the expansion by the crystal growth of the gypsum dihydrate during the process of hydration and setting is greater than the contraction concomitantly occurring therewith, so that a molded product accurately modeled from the die face can be obtained without suffering contraction or distortion. Further, addition of a very small amount of gypsum dihydrate powder to serve as crystalline nucleus to the gypsum hemihydrate powder is particularly preferred since formation of needle crystals is accelerated when the gypsum hemihydrate is hydrated and set and the particles of the conductive metal powder can be dispersed to fill the gaps between the crystals.

On the other hand, as the conductive metal powder to be blended with the gypsum hemihydrate powder, while copper, titanium, tungsten, nickel, brass, phosphorus bronze and lead can be mentioned, copper is preferred in view of feasibility of molding the electrode member, conductivity and cost, particularly preferably as a mixture of two copper powders which are different in the shape and particle size.

It should be noted that the mixing ratio of the gypsum hemihydrate powder to the conductive metal powder is preferably 55 to 45 : 45 to 55 by volume in case of copper powder. The reason is that sufficient strength cannot be obtained in the molded electrode and further the electrode comes to have rough surface to have poor molding accuracy if the amount of the gypsum powder is less than 40% and that molding procedures will be difficult if said amount is less than 30%; whereas conductivity is lowered if said amount is more than 60%. Since the electrode of this invention is required to have an ability of accurately machining a subtle shape of object such as a dental crown and bridge, it is primarily necessary to be produced with excellent moldability and have strength as well as to have excellent conductivity.

The electrode of this invention can be prepared by adding a suitable amount of water, an accelerator for plaster, etc. to a material comprising a mixture of a gypsum hemihydrate powder and a conductive metal powder; kneading the resulting mixture with deaeration, usually in vacuo; modeling and/or molding the kneaded mixture by a method like casting into a desired shape using an inexpensive and easily operable mold made of a silicone rubber and the like to provide an electrode member; drying the electrode member; and subjecting the dried electrode member to impregnation with a surface treating solution containing a conductive metal such as copper, brass, silver, etc. (chemical plating) or to electroplating.

The electrode member can as such be used for electrical discharge machining because of the conductivity by the presence of conductive metal powder incorporated therein as a filler. However, the subsequent plating treatment not only allows the conductive metal contained in the surface treating solution to intrude into the minute gaps present in the electrode member to enhance continuity between the particles of the conductive metal powder preliminarily dispersed as a filler in the electrode member but also forms a thin metal plating layer to reinforce the surface of the electrode member, whereby conductivity and strength of the electrode can be improved. Accordingly, "chipping" as occurred when the electrode member is used as such or when the electrode as disclosed in the prior application is used can be eliminated to provide the electrode with improved durability. Incidentally, if a surface preparation with a silver or copper conductive solution is applied to the electrode member prior to the plating treatment, a uniform metal plating layer can advantageously be formed even when the electrode is used for machining subtle shape of workpiece such as a dental crown and bridge having a considerably irregular surface.

Even when the electrode for electrical discharge machining has a complicated transfer surface, it not only can be obtained with excellent moldability which is attributable to the gypsum hemihydrate powder incorporated therein as a binder but also has excellent conductivity due to the presence of the conductive metal powder incorporated therein as a filler and by the application of surface treatment, and further can retain the desired shape of machining surface over an extended period to enable extended electrical discharge machining.

As described above, while a mixture of at least two such metal powders having different shapes and particle sizes is preferably used as the conductive metal powder, those having very small particle sizes of less than 1 μm will lead to reduced conductivity; whereas those of more than 50 μm cannot be dispersed well as a filler in the electrode member and also cause reduction in conductivity. Accordingly, when high degrees of conductivity and accuracy are required, it is preferred to blend powders with different particle sizes in the range of 1 to 50 μm such that the amount of the larger size particles may be slightly greater than that of the smaller size particles, for example, at a ratio of the former to the latter of 3:2, wherein a preferred combination is spherical larger particles and branched smaller particles in view of dispersibility as a filler. The amount of the gypsum dihydrate powder to be added as crystalline nucleus to the gypsum hemihydrate powder is suitably in an amount in the range of 0.2 to 1% by weight relative to the gypsum hemihydrate powder. The reason is because less than 0.2% by weight of gypsum dihydrate powder incorporated cannot be expected to serve sufficiently as the crystalline nucleus; whereas more than 1% by weight of gypsum dihydrate powder incorporated causes to increase the crystal size after hydration and setting to affect conductivity.

DETAILED DESCRIPTION

This invention will be described in detail by way of preferred embodiments, wherein part(s) all means part(s) by volume unless otherwise specified.

First Embodiment

Figure 1A:
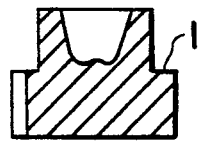
FIGS. 1A and 2A each show a cross section.
Figure 2A:
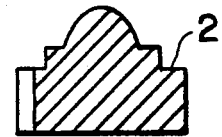
Figure 1B:
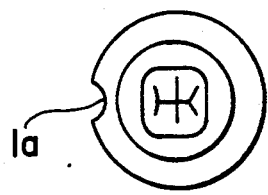
FIGS. 1B and 2B each show a plan view of an electrode for electrical discharge machining (for manufacturing a dental crown and bridge) according to the characteristics of this invention.
Figure 2B:
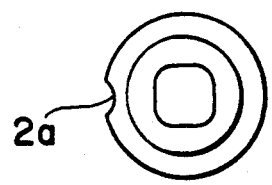

In a 10 Torr vacuum kneader were kneaded well 50 parts of a dental stone (No. 80810 A, manufactured by Noritake Co., Ltd.), 0.5 part by weight of gypsum dihydrate particles having an average particle size of 15 μm, and 50 parts of a conductive metal powder comprising 30 parts of a branched copper powder having an average particle size of 10 μm (according to Fischer sub-sieve sizer method) and 20 parts of a spherical copper powder having a particle size of 325 mesh pass. Then, 3 parts of water to which additives including accelerator for plaster are incorporated was added to the kneaded mixture, followed by kneading under reduced pressure for 60 seconds to prepare a slurry form of deaerated kneaded mixture. The mixture was cast into predetermined silicone rubber molds having transferred thereon casting patterns of a model dental crown and bridge to mold cylindrical electrode members for electrical discharge machining each having a diameter of 10 mm and a length of 30 mm (see FIGS. 1A and 1B showing, in cross section and plan view, respectively, an electrode (1) having transferred thereon the outer surface (4a) of a final product of dental crown and bridge, and FIGS. 2A and 2B showing, in cross section and in plan view, respectively, an electrode (2) having transferred thereon the inner surface (4b) of the final product of dental crown and bridge, wherein (1a) and (1b) are registers when these electrodes are set on an electrical discharge machine). Subsequently, after the electrode members were left for drying at room temperature for 24 hours, they were immersed in a 20% copper sulfate solution for 30 to 300 minutes to effect chemical plating treatment.

Figure 3:
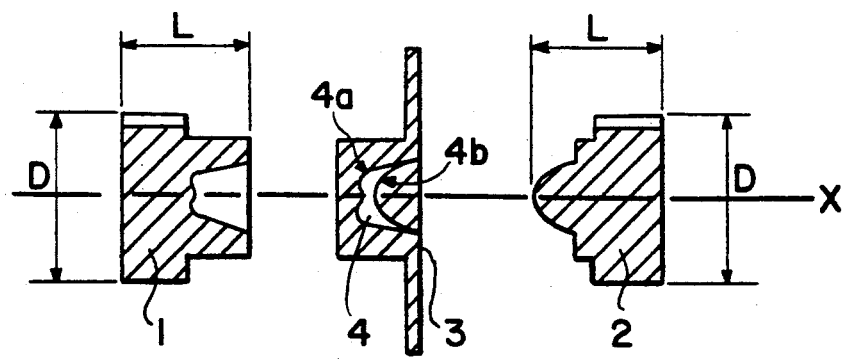
FIG. 3 shows in cross section how a dental crown and bridge can be obtained by electrical discharge machining using the electrode according to the characteristics of this invention; wherein the reference numeral (1) shows an electrode (member) having a transferred outer profile of a dental crown and bridge; (1a) a register; (2) an electrode (member) having a transferred inner profile of the dental crown and bridge; (2a) a register; (3) a material to be subjected to electrical discharge machining; (4) a dental crown and bridge to be obtained by electrical discharge machining; (4a) the outer surface of the dental crown and bridge; and (4b) the inner surface of the dental crown and bridge.

When a dental titanium material was subjected to electrical discharge machining using the thus obtained pair of electrodes at the set current of 6 A, on-time 100 μs, off-time 700 μs (see FIG. 3 in which the two electrodes (1,2) are aligned on the axis "X" of the electrical discharge machine to oppose each other, and a workpiece (3) is machined from the two opposing sides simultaneously, wherein the reference numeral (4) shows a dental crown and bridge to be finally obtained by the electrical discharge machining), electric discharging started immediately after application of electric current compared with the electrode of the prior invention which requires about one minute before discharging started. However, since the plating film was insufficiently formed, the electrodes yet worn away considerably, although not so serious as in the electrode of the prior invention. Moreover, the electrical discharge machining speed was $5.56 \times 10^{-3}$ mm/min which is far below the intended value of $3.13 \times 10^{-2}$ mm/min.

Second Embodiment

A pair of electrodes were prepared in the same manner as in first embodiment, except that the conductive metal powder comprising 5 parts of a branched copper powder having a particle size of 3 μm pass (according to Fischer sub-sieve sizer method), 20 parts of a spherical copper powder having an average particle size of 10

μm and 25 parts of a spherical copper powder having a particle size of 325 mesh pass, and that the immersion was carried out by means of electroplating in a 20% copper sulfate solution containing a plating assistant at a current of 0.05 to 0.08 mA/cm² for 30 to 300 minutes.

When dental titanium materials were subjected to electrical discharge machining using the thus prepared pair of electrodes under the conditions as shown in the following table, wear and tear of the electrodes was greatly improved by the sufficient thickness (50 to 120 μm) of plating film formed on the surface of the electrodes, and substantially desired machining speed was obtained. However, partial wear and tear occurred in the electrodes because of the nonuniformity in the thickness of the plating film on such portions having small degree of irregularity.

|   | Set current | On-time | Off-time | Machining speed |
|---|---|---|---|---|
| A | 16 A | 100 μs | 700 μs | $2.86 \times 10^{-2}$ mm/min. |
| B | 16 A | 46 μs | 322 μs | $3.08 \times 10^{-2}$ mm/min. |
| C | 21 A | 110 μs | 330 μs | $4.00 \times 10^{-2}$ mm/min. |

Third Embodiment

A pair of electrodes were prepared in the same manner as in second embodiment, except that a surface preparation was applied on the dried electrode members using a silver conductive spray, and they were used in a machining test. Each of the electrodes had a smooth surface of uniform plating film with a thickness of 50 to 120 μm, and the intended machining speed was achieved with no partial wear and tear in the electrodes.

As apparent from the foregoing description, the electrode for electrical discharge machining of this invention is free from the problem of molding contraction and can easily be molded if only a simple mold made of a silicone rubber and the like is available, so that it requires simple equipment for the molding and can be produced at a low cost. Thus, various types of electrodes can efficiently be produced even in small lots. Moreover, the present electrode can be produced with high dimensional accuracy to provide excellent machining performance which is equal to or even over the conventional electrodes for electrical discharge machining primarily comprising graphite which suffers poor processability. It should particularly be noted that this invention has enabled machining of hard materials such as titanium into complicated shapes of final articles using inexpensive electrodes with high accuracy. Compared with the electrodes of the prior invention, in which a gypsum hemihydrate powder is used as a binder and a conductive metal powder is used as a filler to prepare electrode members by moldeling and/or molding and setting, which is then impregnated with a conductive solution containing a conductive powder such as graphite dispersed therein, the present electrodes are superior in any of the value of resistance in conductivity, surface accuracy and durability. Accordingly, the electrode of this invention, having overcome the problems inherent in this type of electrodes for electrical discharge machining, contributes very much to the development of the art.

What is claimed is:

1. An electrode for electrical discharge machining, comprising an electrode member produced by subjecting a base and binder of gypsum hemihydrate powder and a filler of conductive metal powder to modeling and/or molding and setting into a desired form of electrode, followed by plating with a conductive metal to enhance mutual continuity in the conductivity of the former conductive metal powder dispersed as a filler in the electrode member and also to form a thin metal layer on the surface thereof.

2. The electrode according to claim 1, wherein the conductive metal powder comprises at least a mixture of a spherical copper powder having a larger diameter and a branched copper powder having a smaller diameter.

3. The electrode according to claim 2, wherein the plating is by chemical plating using a copper sulfate solution.

4. The electrode according to claim 2, wherein the plating is by electroplating using a copper sulfate solution.

5. A process for manufacturing an electrode for electrical discharge machining, which comprises:
kneading in vacuo a gypsum hemihydrate powder, a gypsum dihydrate powder in an amount of not more than 1% by weight of the gypsum hemihydrate powder and a conductive metal powder;
adding water to the kneaded product, followed by further kneading in vacuo;
casting the kneaded product into a mold having transferred a predetermined shape therein to effect hydration, molding and setting to provide an electrode member;
drying the thus obtained electrode member; and
plating the electrode member with a conductive metal, whereby to enhance continuity in the conductivity of the former conductive metal powder particles and also to form a thin metal layer on the surface of the electrode member.

6. The process according to claim 5, the surface of the electrode member is subjected to surface preparation with a conductive metal solution prior to the plating with the conductive metal.

7. The process according to claim 6, wherein the conductive metal powder comprises at least a mixture of a spherical copper powder having a larger diameter and a branched copper powder having a smaller diameter.

8. The process according to claim 7, wherein the plating is by chemical plating using a copper sulfate solution.

9. The process according to claim 7, wherein the plating is by electroplating using a copper sulfate solution.

10. The process according to claim 5, wherein the conductive metal solution is a silver or copper spray.

11. The process according to claim 10, wherein the conductive metal powder comprises at least a mixture of a spherical copper powder having a larger diameter and a branched copper powder having a smaller diameter.

12. The process according to claim 11, wherein the plating is by chemical plating using a copper sulfate solution.

13. The process according to claim 11, wherein the plating is by electroplating using a copper sulfate solution.

14. The process according to claim 5, wherein the conductive metal powder comprises at least a mixture of a spherical copper powder having a larger diameter and a branched copper powder having a smaller diameter.

15. The process according to claim 14, wherein the plating is by chemical plating using a copper sulfate solution.

16. The process according to claim 14, wherein the plating is by electroplating using a copper sulfate solution.

* * * * *